May 16, 1933.  P. M. MILLER  1,909,881
MOTOR VEHICLE BRAKE
Filed Feb. 20, 1928     3 Sheets-Sheet 1
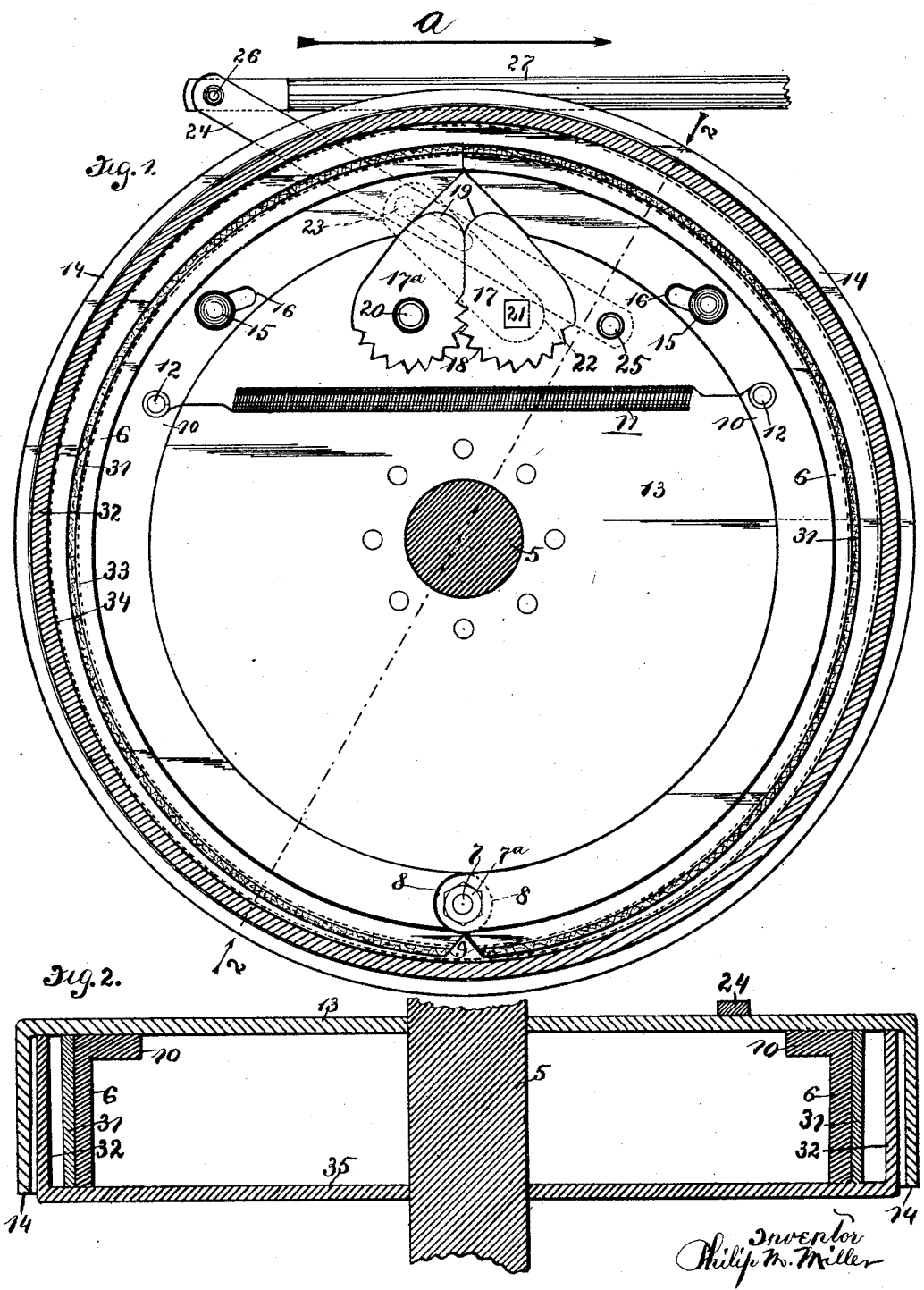

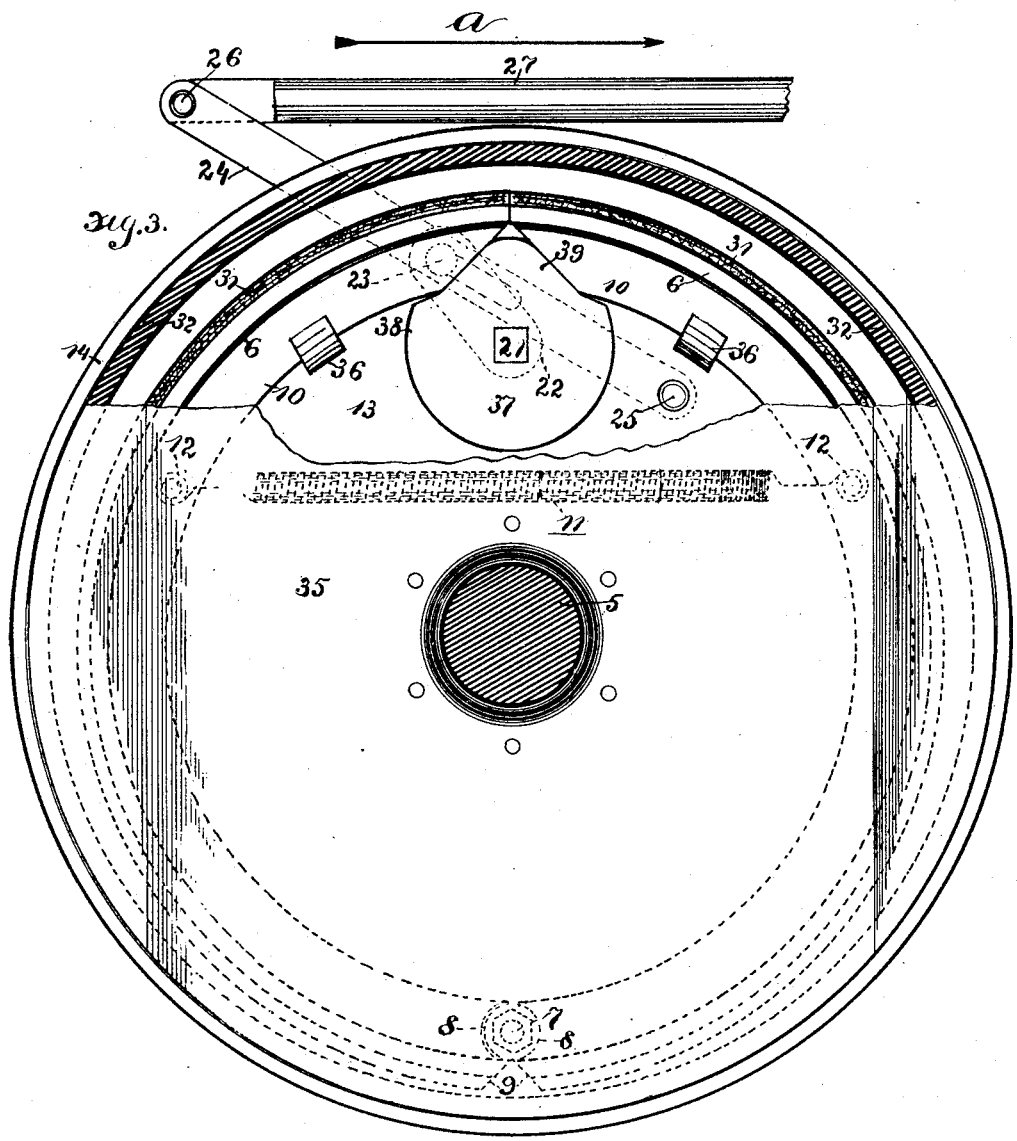

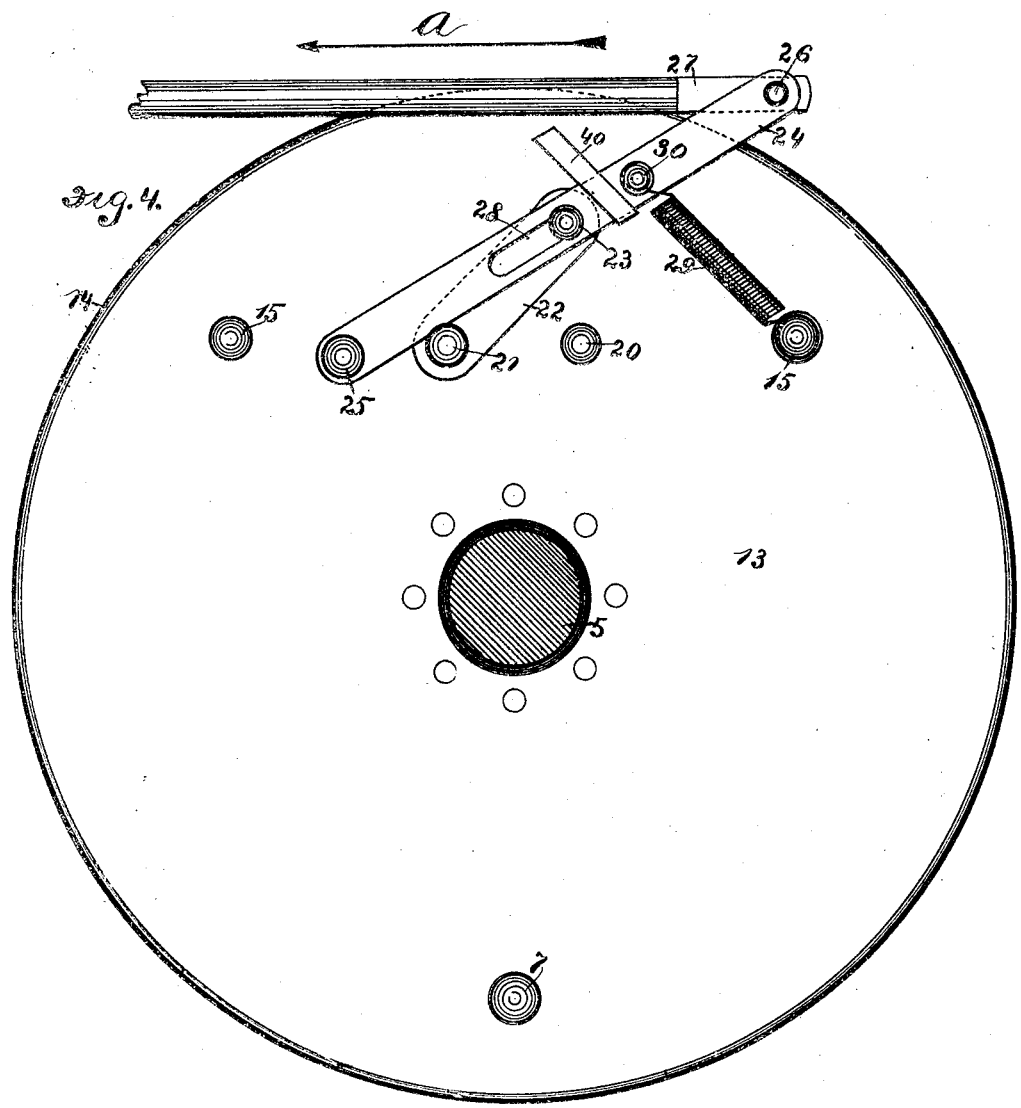

Patented May 16, 1933

1,909,881

UNITED STATES PATENT OFFICE

PHILIP M. MILLER, OF BROOKLYN, NEW YORK

MOTOR VEHICLE BRAKE

Application filed February 20, 1928. Serial No. 255,693.

This invention relates to motor vehicles and more particularly to brake mechanism for such vehicles.

The invention has for its object to provide means for compensating for the wear between the coacting parts of the brake mechanism whereby the length of service of the brake and the effectiveness of the braking action are increased.

Another object of the invention is to provide means whereby the coacting parts are accessible and easily removable, for repairs of the worn parts.

Another object of the invention is to provide means whereby the operating members will produce substantially the same braking action throughout the circumference of the flange of the drum of a motor wheel.

Another object of the invention is to provide a construction in which the braking members are so mounted that they may be assembled prior to being secured in place on motor vehicles.

Another object of the invention is to provide a construction that will be adaptable as a foot and hand brake.

Other objects and advantages of the invention will be apparent from the following description of the accompanying drawings, in which Fig. 1 is a side elevation of the drum of a motor vehicle and the casing carrying the braking mechanism, the drum showing in section with its main body removed to show the interior of the mechanism. Fig. 2 is a cross section thereof taken on the line 2 indicated by the arrows; Fig. 3 is a view similar to Fig. 1 of a modified form, the drum being partially in section; while Fig. 4 is a side elevation of the assembled drum and brake mechanism, showing the rear face of the construction.

The brake mechanism is mounted, as is usual, on the axle or spindle 5, of the front and rear of the motor vehicle, in any well known manner. The brake shoes 6 are pivotally connected as shown at 7 to the casing 13, each of the shoes being provided at its pivoted end with a terminal or lug 8 through which the pivot pin extends from the rigid connection with the casing. The nut 7a is threadedly secured on the pin 7 and is removable therefrom in order to permit removal of the shoes for repairs. Each end 8 of the shoes 6 is provided with a tapered face forming co-operatively a space 9 therebetween in order to facilitate movement of the shoes into contact with the flange 32 of the drum member 35. Each of the shoes 6 is provided with a laterally disposed strengthening rib 10, which may be centrally disposed if desired, and which extends substantially throughout the length of the shoe and a spring 11 engages, at its opposite ends, pins 12 carried by the ribs 10, the spring to retract the shoes after the shoe actuating means has been released.

The flange 14 of the casing 13 forms the outer member of the assembled drum and brake mechanism, while the flange 32 of the drum 35 forms the inner member, and both casings 13 and 35 telescope one with another, in order to provide a mudproof construction and clearance therebetween. The casing 13 is oppositely provided with fixed pins 15 each passing through the slot 16 formed in the ribs 10 of the shoes 6, thereby preventing accidental displacement of the shoes and providing means whereby the shoes slide upon the pins 15 when the brake mechanism is in operation, the pins also acting as stops to limit the inward movement of the shoes, in the manner hereinafter described.

The brake shoe actuating mechanism comprises pear-shaped cam members 17 and 17a, each provided with corresponding teeth 18, the teeth of one engaging the teeth of the other. The opposite end of each cam member 17 and 17a is of circular form as shown at 19, for the purpose hereinafter described. Member 17a is pivoted to pin 20 which in turn is permanently fixed to the casing 13, while member 17 is rigidly fixed to pin 21 which journals in the bushing or opening in the casing 13 and is fixed to actuating member 22 as shown in Fig. 4. The cam members 17 and 17a are, as shown, in engagement one with another in order that the circular ends 19 thereof snugly contact with the sides of the ends of the ribs 10 of the shoes 6, for actuating the shoes into engagement with the flange of the drum when the operating members, as hereinafter described, are operated. Member 22 as shown is positioned parallel with the outer face of the casing 13 and extended from cam pin 21 which is fixed to member 17 and passed through an opening such as a bushing fixed in the casing, the member 22 being positioned diagonally and pivoted to member 24 approximately midway as at 23, between the pivoted connection 25 upon the casing and the pivotal connection 26 with the member 27. The member 24, as shown, is also positioned diagonally on the outer surface of the casing at a suitable angle relatively to member 27, in order to provide a pivotal connection 25 in relation with the pivotal connection 23, for the purpose of affectuating movement of the members whenever the member 27 is moved.

With the arrangement of the parts as shown, member 17a is pivoted upon the pin 20 which is fixed in the casing 13, while member 17 is fixed upon the pin 21 which journals in a bushing fixed in the casing and fixed to member 22; the opposite end of member 22 is pivoted to member 24 as at 23; and member 24 which is the longest of the two, is pivoted at one point 25 to the casing and to member 27 at the other point 26. Members 17 and 17a permanently engage one another by means of the teeth 18, and the opposite ends 19 contact with the ends of the ribs 10, which although shown of tapered type, may be of any type to provide perfect contact with the members for operating the device.

As shown in Fig. 4, member 24 is further provided with a slot 28 through which the pin 23 passes, and its head holds both members 22 and 24 in sliding engagement one with another. A spring 29 is secured to the casing as at 15 and to member 24 as at 30, the spring acting to retract the members 22, 24 and 27 in cooperation with spring 11 which act to retract the shoes 6, after the shoe actuating means has been released. Member 40 is fixed to the casing and acts as a stop to limit inward movement of the members.

The members 17, 17a, 22 and 24 may be actuated in any suitable manner and in the form of the invention shown are actuated by means of member 27 which is connected in the usual manner with an operating lever or foot pedal, or both on the vehicle.

As is well known, the coacting parts of the brake mechanism of a motor vehicle receive hard wear, for instance, the brake lining 31 or other parts, and to compensate for this wear between the coacting parts, the members of the mechanism are connected for easy removal and replacement, the nut 7a when disengaged from the pin 7 permitting removal of the shoes from engagement with the pins 15 and spring 11.

In Fig. 3 a modification is shown, wherein the ribs 10 of the shoes 6 are engaged upon the brackets 36 which are fixed to the casing 13, the brackets acting as stops to limit the inward movement of the shoes, as hereinbefore described. Instead of members 17 and 17a shown in Fig. 1 and hereinbefore described, member 37 is fixed to pin 21 and connectively related to members 22, 24 and 27 as in the manner hereinbefore described in connection with Fig. 1. Member 37 is provided with a circular major portion 38 and a tongue 39 engaging the ends of the ribs 10 of the shoes 6.

The operation of the brake mechanism is herein briefly described as follows: When the motorist desires to throw the braking mechanism into operation, the member 27 is moved by means of suitable foot, hand, hydraulic or other mechanisms attached on the motor vehicle, by which member 24 is moved from its neutral position to pivot on pin 25 at one point and pivot in relation with member 22 at the other point 23, thereby sliding one in relation to another and the inner pivotal end 25 acting as a fulcrum for operating pivotally member 22 in sliding engagement by its pivot 23 with the sides of the slot 28 in member 24 from neutral position, to turn member 17 to contact with the rib of the shoe, the teeth 18 of member 17 engaging in the corresponding teeth 18 of member 17a, and member 17 moves member into contact with the rib of the other shoe. Upon further or forcible moving of the members 22, 24 and 27 from neutral position, members 17 and 17a are rotated, teeth of one engaging the teeth of the other, with the round ends 19 carried in opposite directions to cause the brake shoes to spread outwardly and forcibly and engage the flange 32 of the drum 35, thus wedging the lining 31 on the shoes thereagainst.

The manner and the effectiveness of operation of the device shown in Fig. 3, produce the same result of operation and effect as hereinbefore described in relation with Fig. 1.

When the actuating mechanism for the brake has been released the spring 11 retracts the shoes 6 and the spring 29 likewise retracts the members 22, 24 and 27 to their normal position, in which position the pins 15 carried by the casing 13 engage the inner side of the slots 16, and the member 24 engages upon the bracket 40, and the ends 9 of the shoes are then retracted to a position that a circumferential space is formed between the shoes and flange of the drum, in order to prevent frictional contact of one with the other when the wheel with the drum is revolving under motion of the motor vehicle.

From the above description it will be seen that a simple and effective brake mechanism has been devised and moreover, a mechanism by means of which the wear between the contacting parts may be compensated for, thereby increasing the life of the brake.

It will also be seen that the mechanism has been so constructed in such a manner that all the operating parts thereof may be assembled before placing the brake in position on the motor vehicle, and the parts are accessible for removal for repairs.

While the embodiments of the invention have been specifically described and illustrated, it should be understood that the invention is capable of modification, variation and substitution without departing from the spirit and scope of the appended claims.

What I claim and desire to secure by Letters Patent is:

1. Brake mechanism comprising a drum and a casing having telescoping flanges, pivotally connected brake shoes carried by said casing, a pair of coacting cam members for moving the shoes into contact with the flange of the drum, said cam members being provided with intermeshing teeth, one of said cam members being pivoted to the casing and the other of said cam members being fixed to a shaft which is extended laterally through the casing, an operating lever fixed to the extended portion of said shaft, and provided with a pivotal member on its free extremity, another operating lever pivotally anchored at one extremity to the casing and formed with a slot at an intermediate portion thereof in which the said pivotal member of the first-named operating lever has sliding engagement, a third operating lever pivotally connected to the slotted lever and adapted for operative engagement with brake-operating mechanism, means for retracting the operating lever to a neutral position, means for limiting excess movement of said levers from a neutral position, and means for retracting said brake shoes to a neutral position.

2. Brake mechanism comprising a brake drum and a backing plate, brake shoes movably connected to said backing plate and pivotally connected to one another, means for normally urging said shoes to a retracted position, a pair of cam members rotatably mounted on the backing plate and adapted to contact with one another and the free ends of the brake shoes, said cam members being provided with intermeshing teeth, one of said cam members being pivoted to the backing plate and the other of said cam members being fixed to a shaft which is extended transversely through an opening in the backing plate, a lever fixed to said shaft and provided with a pin at its free extremity, another lever pivotally anchored to the backing plate and formed with a slot in which said pin has sliding engagement, said levers being arranged at an angle with respect to the horizontal, a third lever pivoted to said second named lever and adapted to be actuated by a brake pedal or analogous member whereby a compound lever action is applied to said cam members for moving the brake shoes into contact with the flange of the drum, means for retracting the levers into a neutral position, and means for preventing excessive retraction movement thereof.

3. Brake mechanism comprising a brake drum and a backing plate, a plurality of pivotally connected brake shoes supported for limited movement on the backing plate, means for normally urging the shoes to a retracted position, a plurality of cam members in contact with one another and having cam surfaces in contact with the free ends of the shoes, said cam members being formed with teeth which intermesh to thereby move said cam members in unison when acting to move the shoes into braking engagement with the flange of the drum, one of said cam members being pivoted to the backing plate and another of said cam members being fixed on a shaft which is journaled in the backing plate and projects transversely therebeyond, a lever member fixed to said shaft, a coacting lever member pivotally anchored to the backing plate, said coacting lever members having a sliding pivotal connection one with another and extending tangentially with respect to the drum, means connecting said second-named lever member with the brake-operating mechanism of a vehicle, and means for retracting said lever members to a neutral position.

4. Braking mechanism comprising a flanged brakedrum, a backing plate, a plurality of pivotally connected brake shoes, and means for moving said shoes into braking engagement with respect to the flange of the drum, comprising a pair of coacting cam members formed with cam portions which act on the free ends of the brake shoes and toothed portions which intermesh for positive movement of said members in unison one with another, and means for rotating said cam members to throw the cam portions thereof in counter directions and exert a cam action on the free ends of said shoes.

5. Braking mechanism comprising a flanged brake drum, a backing plate, a plurality of pivotally-connected brake shoes, and means for moving said shoes into braking engagement with respect to the flange of the drum, comprising a pair of coacting pear-shaped combined sector gears and cam members in contact with one another with the gear sectors in constant mesh for positive movement in unison of said members and the cam portions thereof in contact with the free ends of said shoes, and means for rotating said cam members to exert a cam action on the free ends of said shoes.

6. Braking mechanism comprising a flanged brake drum, a backing plate, a plurality of pivotally-connected brake shoes, a pair of coacting cam members formed with cam portions which act on the free ends of the brake shoes and toothed portions which intermesh for positive movement of said members in unison one with another, one of said cam members being pivoted to said plate and the other of said members being fixed on a shaft which is journaled in said plate, an operating lever fixed to said shaft and a coacting relatively long operating lever pivotally anchored to said plate and having a sliding pivotal connection with the first-named lever, and means for moving said pivotally-anchored lever about its pivot to rotate said cam members and move the shoes into braking engagement with the flange of the drum.

In testimony whereof I affix my signature.

PHILIP M. MILLER.